United States Patent
Lashina et al.

(10) Patent No.: US 8,749,482 B2
(45) Date of Patent: Jun. 10, 2014

(54) MIRROR FEEDBACK UPON PHYSICAL OBJECT SELECTION

(75) Inventors: Tatiana Aleksandrovna Lashina, Eindhoven (NL); Evert Jan Van Loenen, Eindhoven (NL); Sander Bernard Francis Van De Wijdeven, Eindhoven (NL); Gerrit Hollemans, Eindhoven (NL); Kero Van Gelder, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 957 days.

(21) Appl. No.: 12/302,356

(22) PCT Filed: May 9, 2007

(86) PCT No.: PCT/IB2007/051743
§ 371 (c)(1),
(2), (4) Date: Apr. 30, 2009

(87) PCT Pub. No.: WO2007/138504
PCT Pub. Date: Dec. 6, 2007

(65) Prior Publication Data
US 2009/0231273 A1 Sep. 17, 2009

(30) Foreign Application Priority Data
May 31, 2006 (EP) .................................... 06114760

(51) Int. Cl.
*G06F 17/00* (2006.01)
*A47B 81/00* (2006.01)
*A47G 1/00* (2006.01)
*G02B 5/08* (2006.01)
*B42F 21/00* (2006.01)

(52) U.S. Cl.
USPC ............. 345/156; 40/219; 312/225; 312/234; 700/231

(58) Field of Classification Search
CPC .......... A47F 11/04; A47F 11/08; G09F 19/16
See application file for complete search history.

(56) References Cited

U.S. PATENT DOCUMENTS 5,646,596 A    7/1997   Gumm
5,999,317 A *  12/1999  Whitney .................. 359/489.12

(Continued)

FOREIGN PATENT DOCUMENTS

| GB | 2232520 A | 12/1990 |
| WO | 0201288 A1 | 1/2002 |
| WO | 03079318 A1 | 9/2003 |
| WO | 2007015200 A2 | 2/2007 |

*Primary Examiner* — Daniell L Negron
(74) *Attorney, Agent, or Firm* — Yuliya Mathis

(57) ABSTRACT

A highlighting method and an interaction system (100) include a switchable mirror (110) facing a first side of an item (120) having a second side facing a viewer (130); and a processor (220) configured to perform switching the mirror from a transparent or non-transparent state to a reflective state so that said first side of said item (120) becomes visible to the viewer (130) through reflection from the switchable mirror (110). A light source (170) is configured to provide incident light to the switchable mirror (110) for reflection from the switchable mirror (110) in the reflective state for illuminating the first side of the item (120).

15 Claims, 1 Drawing Sheet

(56) References Cited

U.S. PATENT DOCUMENTS

Figure 1:
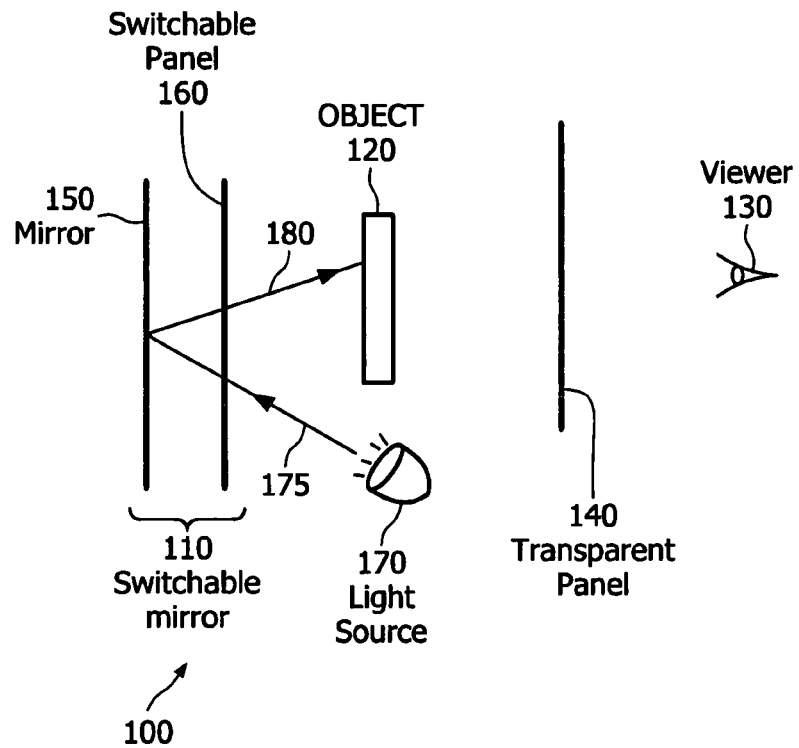

| | | |
|---|---|---|
| 6,607,275 B1 | 8/2003 | Cimini et al. |
| 6,646,633 B1 * | 11/2003 | Nicolas .................. 345/173 |
| 7,671,841 B2 * | 3/2010 | Lee et al. ................ 345/158 |
| 7,679,808 B2 * | 3/2010 | Kim ......................... 359/267 |
| 7,894,117 B2 * | 2/2011 | Finlayson ................. 359/267 |
| 2003/0057887 A1 | 3/2003 | Dowling et al. |
| 2004/0021921 A1 | 2/2004 | Richardson |
| 2004/0169789 A1 | 9/2004 | Mathey et al. |
| 2004/0229049 A1 | 11/2004 | Boire et al. |

* cited by examiner

MIRROR FEEDBACK UPON PHYSICAL OBJECT SELECTION

This application is a national stage application under 35 U.S.C. §371 of International Application No. PCT/IB2007/051743 filed on May 9, 2007, and published in the English language on Dec. 6, 2007 as International Publication No. WO/2007/138504, which claims priority to European Application No. 06114760.9, filed on May 31, 2006, incorporated herein by reference.

The present invention relates to an interaction solution for providing system feedback as result of the user selecting an object in the interactive shop window, for example, based on using a switchable surface such as a mirror mounted behind the object, where colored light may be reflected by the mirror, for example.

For entertaining customers and for the sake of providing extra information about products, retailers already deploy various display technologies ranging from large LCD or plasma displays to transparent projection screens. These displays can often be found installed in shop windows where they are used to display video clips, a slide show with announcements or information about the shop or their products. Most of the currently used shop window displays are pure informative non-interactive screens. More advanced shop window displays offer some interactivity with the display on a basic level, where a user can press a button on or near the display to activate some functionality, such as go to a next or previous page.

A more attractive shop window can be realized by combining physical products exhibited behind the shop window and a shop window display that would show information about the product the user is interested in. Such a shop window display system may infer the interest of the user either using gaze tracking or pointing gestures detection, as described in European Patent Application Serial Number 05107205.6, filed Aug. 4, 2005, entitled "Augmented Shop and Show Windows" which is incorporated herein by reference in its entirety. In such an interactive shop window, the user may look or point at a physical product. The looking/gazing and/or pointing is detected by the shop window, in response to which the shop window displays information about the product on the display. Such a shop window is advantageous since it enables both being able to actually see the real physical product and at the same time get additional (digital) information, including various interactive services provided/suggested on the display.

In typical Graphical User Interface (GUI) design practice, feedback regarding system status is often provided. This principle follows one of the usability heuristics that stresses the importance of the visibility of system status. Such a principle follows the notions that the system should always keep users informed about what is going on, through appropriate feedback within reasonable time. Following this principle in GUI design, it is a common practice to highlight an item of focus or the one that has been activated by the user. For tangible user interfaces, it has been demonstrated to highlight a physical object using a projection, e.g. in what is referred to as react-Table or SmartSkin. Further, a switchable linear polarizer for realizing a display mirror that can switch between reflective and transmission mode is also described in U.S. patent application Ser. No. 10/507,730, entitled "Mirror With Built-In Display," which is incorporated herein by reference in its entirety.

In shop windows for example, it is important to provide customers with feedback indicating which product is selected by 'highlighting' the product, similar to the feedback techniques used in GUIs. However, a highlighting using a projection or a spot light will be hardly visible, particularly during daylight, since most shop windows are placed outside and exposed to natural light. Another problem with using a spot light for product highlighting is that the system will be limited with respect to the number of products that can be highlighted, as many spot lights are needed that are directed to shine on the various products. Another limitation is that the layout of the products, or shelves containing the products, needs to be adjusted for proper combination of product placement and spot lights locations/direction of the shining lights therefrom, so that no product is placed in the way of the spot light to prevent light blockage from the spot light to the desired/illuminated product.

Another problem is that when products are exhibited behind the glass of a shop window for example, only the front part(s) of the product(s) facing the user/viewer can be viewed. That is the back of the product is not viewable by the user/viewer. For showing the back of the product, a bulky electromechanical rotating platform would need to be used for every product, which is in most cases too cumbersome and expensive to install and move as the decoration of, or product placement in, the shop window is changed.

Accordingly there is a need for a better interactive system for providing feedback as result of the user selecting an object in the interactive shop window, for example, based on using a switchable mirror mounted behind the object, which can also be used in combination with a light source including colored light that is directed to and reflected by the mirror, where also the backside of the object is viewable by the user.

One object of the present systems and methods is to overcome the disadvantage of conventional interactive systems.

This and other objects are achieved by systems and methods that include a highlighting method and an interaction system comprising a switchable mirror facing a first side of an item having a second side facing a viewer; and a processor configured to perform switching the mirror from a transparent state to a reflective state so that the first side of the item becomes visible to the viewer through reflection from the switchable mirror. Further, a light source is configured to provide incident light directed to the switchable mirror for reflection from the switchable mirror in the reflective state for illuminating the first side of the item. Any controllable light source which may include at least one of a light emitting diode, incandescent, fluorescent, halogen, and high intensity discharge light source.

The systems and methods for providing feedback are responsive to user selection of a physical object, e.g., displayed in a shop window. The user selection may be effectuated with a gesture, gaze or by any other selection means. The systems and methods may be used in different lighting conditions including natural light. The systems and methods include using a mirror mounted behind an object, for example, and as such the systems and methods provide an additional advantage in that the back of the object is visible to the user.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

Figure 2:
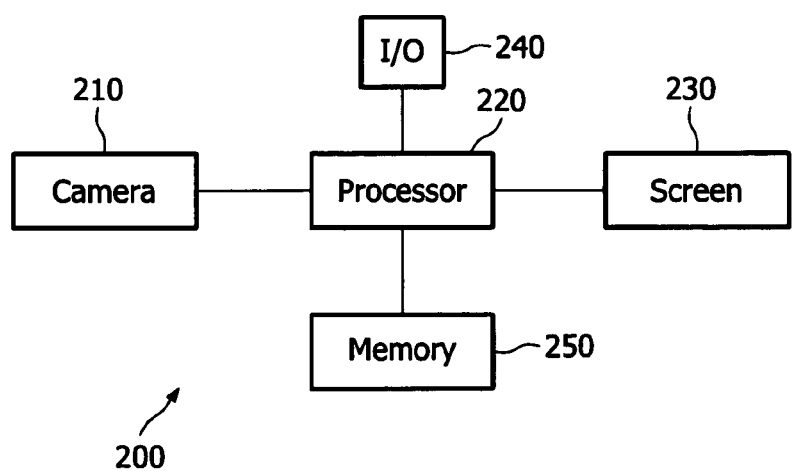

These and other features, aspects, and advantages of the apparatus, systems and methods of the present invention will become better understood from the following description, appended claims, and accompanying drawing where:

FIG. 1 shows an interactive system according to one embodiment of the present invention; and FIG. 2 shows a block diagram according to another embodiment of the present invention.

The following description of certain exemplary embodiment(s) is merely exemplary in nature and is in no way intended to limit the invention, its application, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed system and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

FIG. 1 shows an interactive system 100 having a switchable mirror 110 located behind an object or item 120 viewed by a viewer or user 130 from the front side of the object 120. The object/item 120 may be any item, such as a product displayed in a shop window, in which case there typically is a transparent glass, plastic or other transparent material or panel 140 between the object 120 and the viewer 130. It should be understood that the object 120 and the location may be any object and location displayed for viewing or using by the viewer/user 130. For example, the object 120 may be artwork displayed in a museum for interactive physical exhibits, with or without any material 140 between the object 120 and the viewer 130.

Further, many objects 120 may be displayed in close proximity or otherwise. An item selection means allows selection of one or more of the objects 120, such as via detectors that detect viewer's gaze and/or pointing at the physical item 120, or pointing to a virtual item displayed on a screen of a device, e.g., screen of a portable device such as a personal digital assistant (PDA) or mobile phone that communicates with the system 100 through a short range wireless link, such as Bluetooth. The window showcase for example is mapped onto the screen of the device, where the user 130 can point on the screen and select one or more of the objects 120. In response to user selection of an item(s) 120, the interactive system 100 is configured to provide feedback related to the selected item 120. The feedback may be in the form of highlighting the selected item, such as providing light reflected from the switchable mirror 110 and to the back side to the selected item 120. Further the switchable mirror 110, in the reflective state, provides a view of the back side of the item 120.

The user may select an item 120 among many items by pointing to the object itself where, as shown in FIG. 2 which illustrates a block diagram 200 according to another embodiment, a camera 210 connected to a processor 220 is configured to detected the user selection, such as using gaze tracking or pointing gestures detection, as described in European Patent Application Serial Number 05107205.6, filed Aug. 4, 2005, entitled "Augmented Shop and Show Windows". Alternatively, the user may select an item 140 by pointing on a screen 230 displaying the plurality of selectable items, such as using a mouse or any other input/output device or simply his/her finger 240, such as a keyboard, or a pointer/finger in the case of a touch-sensitive display. As is well known, a memory 250 is provided which is operationally coupled to the processor 220 for storing data including operating system and application data to be accessed and executed by the processor to achieve desired functions and results.

Returning to FIG. 1, behind each item 120 exhibited in the shop window for example, the switchable mirror 110 is mounted at a desired angle, such as an angle that makes it comfortable for visitor or viewer 130 to see the back of the product/item 120. In one embodiment, the switchable mirror 110 is made switchable between reflective and non-reflective states so that when the product 120 is selected by the user 130, the switchable mirror 110 switches to its reflective state and will make the back of the product 120 visible to the customer 130.

This set-up can be realized by positioning a mirror 150 behind the product 120 and placing a switchable glass panel 160 between the product 120 and the mirror 150. Illustratively, the switchable glass panel 160 includes a PRIVA-LITE™ panel that can be switched between being opaque or transparent with the controller 220, so that in the transparent state the mirror 150 behind PRIVA-LITE™ 160 will be visible, and in the opaque state the customer 130 sees the PRIVA-LITE™ diffusing surface that block view of the mirror 150.

The PRIVA-LITE™ panels that may be used as the switchable glass panel 160 are manufactured in Belgium by subsidiary of Saint Gobain Glass Company, where such panels include a liquid crystal (LC) film sandwiched between to sheets of glass. The LC film includes LC in a polymer matrix sandwiched between conductive coatings. When the PRIVA-LITE™ panels is switched off from its special power supply connected to the conductive coatings, the liquid crystals are randomly scattered and diffuse light in all directions. In its OFF state, the PRIVA-LITE™ is translucent and prevents both sides from seeing through the glass panel. By providing power and switching the PRIVA-LITE™ panel ON, the liquid crystals line up and re-orientate themselves, turning the PRIVA-LITE™ totally transparent.

Alternatively, other panels that are switchable between transparent and non-transparent states may be used, such as described in U.S. Patent Application Publication Numbers 2004/0169789A1 and 2004/0229049, which are incorporated herein by reference in their entirety. Of course, the mirror 150 and switchable glass 160 may be integrated as one unit instead of being separate units. Other switchable mirrors or reflective films may also be used, such as described in U.S. Patent Application Publication Number 2004/0021921 A1, and International Publication Number WO 02/01288A1, which are incorporated herein by reference in their entirety. Further, as noted above, a switchable polarizer may be used for realizing the switchable mirror 110, including λ/2 retarders and switchable polarizing filters, as described in above-noted U.S. patent application Ser. No. 10/507,730. The switchable polarizer is switchable between a reflective and transparent mode.

In response to selection by the user 130 of an item 120, the switchable mirror 110 located behind the item 120 is switched from the transparent or opaque mode to the reflective mode, where otherwise the switchable mirror 110 is in the transparent or opaque mode, which is the default mode, for example. It may be desirable to use switchable mirrors that change states between transparent and reflective modes, instead of switchable mirrors that change states between opaque and reflective modes, so that in the transparent mode, other objects behind the switchable mirror 110 may be visible to the viewer 130.

Providing feedback by switching on the switchable mirror 110 can be made more noticeable if simultaneously to the activation of the mirror mode, a light source 170 is switched on which provides light rays 175 directed towards the mirror 150. In this case the reflected light 180 (reflected from the mirror 150) will highlight the product 120, as if a lamp is placed behind the product 120. By using a controllable light source, such as a red, green and blue (RGB) light emitting diode (LED) light source, it becomes possible to change the color of the light 175 directed to the mirror 150 and then reflected to the product 120.

LEDs are light sources that are particularly well suited to controllably provide light of varying attributes, as LEDs may easily be configured to provide light with changing colors, intensity, hue, saturation, beam width, spot size and other attributes, and typically have electronic drive circuitry for control and adjustment of the various light attributes. However, any controllable light source may be used that is capable of providing lights of various attributes, such as various intensity levels, different colors, hue, saturation, beam width, spot size and the like, such as incandescent, fluorescent, halogen, or high intensity discharge (HID) light and the like, which may have a ballast or drivers for control of the various light attributes.

Further, using colored light allows for color coding. Thus, for example, color-coding may be used to distinguish between feedback provided to different users interacting with the shop window simultaneously, where user A is assigned the color red, user B is assigned the color green, user C is assigned the color blue, user D is assigned the color orange or any combination of color, hue, saturation and/or light intensity. In such a color-coded scheme, each user receives feedback using the color assigned to that user by the system, or an available color selected by the user, e.g., from the user's PDA or other devices that are operationally coupled to the system 100, through any links, wired or wireless for example.

In addition, color coding may be used to indicate 'related' products with the same color. Of course, one skilled in the art may devise various combination of color-coding in view of the present disclosure, such as using same or similar colors for highlighting related products, with same or similar light attributes, such as same or similar intensity hue, saturation and the like. Illustratively, the color intensity varies from its maximum, illuminating the user-selected product, to lower intensity for illuminating other related products, where for example, the next most relevant product, or promotional product which is on sale at a discounted price is illuminated with a lower intensity level, and further products are illuminated with even lower intensity levels and the like. Related products may be products of the same brand as the user-selected product, the same product category, and/or compatible products. For example, when the user selects a photo camera, then related products that may be illuminated with light having any desired light attribute may be memory cards, batteries, printer, etc.

Of course, as it would be apparent to one skilled in the art of communication in view of the present description, various elements may be included such as a light source controller which may be separate or integrated with the processor. The controllable light source includes drivers and may also include other elements, such as elements for wireless communication and control including one or more transmitters, receivers, or transceivers, antennas, modulators, demodulators, converters, duplexers, filters, multiplexers etc., which may also be included or coupled to the processor or controller for wireless light control. Such well-known elements will not be further described in order not to obscure description of the present system and method.

As is well-known, the processor 220 executes instruction stored in the memory 250, for example, which may also store other data, such as predetermined or programmable settings related to control of the light source(s), including programmable grouping of lights and light attributes/settings to illuminate related, relevant or desired products, such as intensity (i.e., dimming function), color, hue, saturation, beam width, direction, color temperature, mixed colors, and the like, for the case of light source that may be controlled to change attributes of light emanating therefrom. Of course, the desired color attributes may be the same or different for groups or for lighting units within one group. That is, individual light units may provide light of different desired attributes despite being in a single group associated with a single consumer. Thus, one group of light sources provides a particular colored-light, where other light attributes may be varied, such as the intensity for example, to highlight/illuminate items 120 with varying degrees of highlighting.

It should be understood that the various component of the interaction system may be operationally coupled to each other by any type of link, including wired or wireless link(s), for example. Various modifications may also be provided as recognized by those skilled in the art in view of the description herein. The memory may be any type of device for storing application data as well as other data. The application data and other data are received by the controller or processor for configuring it to perform operation acts in accordance with the present systems and methods.

The operation acts of the present methods are particularly suited to be carried out by a computer software program, such computer software program preferably containing modules corresponding to the individual steps or acts of the methods. Such software can of course be embodied in a computer-readable medium, such as an integrated chip, a peripheral device or memory, such as the memory or other memory coupled to the processor of the controller or light module.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory 250.

Additional memories may also be used. The computer-readable medium, the memory 250, and/or any other memories may be long-term, short-term, or a combination of long- and -short term memories. These memories configure the processor/controller 220 to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory, for instance, because the processor may retrieve the information from the network.

The processor 220 and the memory 250 may be any type of processor/controller and memory, such as those described in U.S. 2003/0057887, which is incorporated herein by reference in its entirety. The processor may be capable of providing control signals and/or performing operations in response to selecting and grouping light modules and/or selecting predetermined or programmable light settings, and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems.

An interaction feedback has been described as result of the user selecting an object in the interactive shop window, for example. The feedback may be based on using a switchable surface, such as a mirror mounted behind the object, where colored light may be reflected by the mirror, for example. Advantages of the interaction feedback includes showing the backside of the object, drawing and keeping the user's attention, providing useful information, and highlighting desired features of the object(s) selected by the user, as well as suggesting/highlighting other objects that may be of interest to the user.

Of course, it is to be appreciated that any one of the above embodiments or processes may be combined with one or with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. An interactive system comprising:
a plurality of items positioned between a viewing position and a switchable mirror; and
a processor operationally coupled to a memory with application data and configured for
receiving an indication of user selection for a selected one of the plurality of displayed items; and
switching said switchable mirror from a transparent state to a reflective state so that a mirror-facing backside of said selected one of the plurality of items becomes visible from the viewing position through reflection from said switchable mirror;
providing control signals in response to the indication of user selection to execute a programmable light setting.

2. The interactive system of claim 1, further comprising a light source configured to provide incident light to said switchable mirror for reflection from said switchable mirror in said reflective state for illuminating said mirror-facing backside of said selected one of the plurality of items in response to the control signals.

3. The interactive system of claim 2, wherein said light source comprises at least one of a light emitting diode, incandescent, fluorescent, halogen, and high intensity discharge light source.

4. The interactive system of claim 1, wherein the indication of user selection is at least one of pointing at said selected one of the plurality of items, gazing at said selected one of the plurality of items and/or selecting said selected one of the plurality of items from a representation thereof on a display.

5. The interactive system of claim 4, further comprising a detector configured to detect at least one of said pointing and said gazing.

6. The interactive system of claim 1, wherein said switchable mirror comprises a mirror and a switchable panel located between said mirror and said plurality of items, said switchable panel being switchable between a transparent state and a non-transparent state.

7. The interactive system of claim 6, wherein said switchable panel includes a polarizer.

8. A processor implemented method for viewing a selected object comprising:
detecting a selection of one of a plurality of objects,
wherein at least one of said plurality of objects has a frontside and a backside opposite said frontside; and
response to said selection of one of the plurality of objects, switching a switchable mirror positioned behind the selected one of the plurality of objects from a transparent state to a reflective state;
illuminating said selected object by a light source to provide incident light to said switchable mirror;
the light source configured to emit light for reflection from said switchable mirror in said reflective state for illuminating a backside of said selected object.

9. The method of claim 8, wherein said selecting comprises at least one of pointing and gazing at said selected object or selecting said selected object from a representation thereof on a display.

10. The method of claim 8, wherein said light source comprises at least one light-emitting diode for controllably providing incident light of at least one varying attribute.

11. The method of claim 10, further comprising varying at least attribute of said incident light based at least, in part on at least one attribute of said item.

12. An interactive system for illuminating a selected object by reflection, comprising:
- an item positioned between a viewing position and a switchable mirror, the item having a frontside visible to the viewing position and a backside not visible to the viewing position;
- a light source comprising at least one light-emitting diode for controllably providing incident light of at least one varying attribute to said switchable mirror;
- a processor operationally coupled to a memory with application data and configured for switching said mirror from a transparent state to a reflective state in response to a selection signal generated in response to a user at said viewing position;
- wherein the backside of said item becomes illuminated by said light emitted by the light source and visible to said viewing position through reflection from said switchable mirror.

13. The interactive system of claim 12, wherein said attribute is selected from the group consisting of: color, color temperature, intensity, hue, saturation, beam width, and spot size.

14. The interactive system of claim 12, further comprising electronic drive circuitry for controlling said light source in coordination with said processor.

15. The interactive system of claim 12, wherein the attribute of said light is varied based at least in part on at least one attribute of said item and/or said selection.

\* \* \* \* \*